(12) United States Patent
Spruell

(10) Patent No.: US 11,669,989 B1
(45) Date of Patent: Jun. 6, 2023

(54) PROVIDING PARTIAL MATERIAL PACKAGE REMAINING MATERIAL AND LOCATION

(71) Applicant: Southwire Company, LLC, Carrollton, GA (US)

(72) Inventor: Stephen Lee Spruell, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 140 days.

(21) Appl. No.: 17/313,717

(22) Filed: May 6, 2021

Related U.S. Application Data

(60) Provisional application No. 63/021,402, filed on May 7, 2020.

(51) Int. Cl.
*G06T 7/62* (2017.01)
*H04W 4/029* (2018.01)

(52) U.S. Cl.
CPC .............. *G06T 7/62* (2017.01); *H04W 4/029* (2018.02); *G06T 2207/20081* (2013.01)

(58) Field of Classification Search
CPC . G06T 7/62; G06T 2207/20081; H04W 4/029
See application file for complete search history.

(56) References Cited

U.S. PATENT DOCUMENTS

| | | | |
|---|---|---|---|
| 11,383,283 B1 * | 7/2022 | Clark | ...................... B21C 51/00 |
| 2019/0197466 A1 * | 6/2019 | Hand, III | ............... H04N 7/185 |

\* cited by examiner

*Primary Examiner* — Joshua L Schwartz
(74) *Attorney, Agent, or Firm* — Merchant & Gould P.C.

(57) ABSTRACT

Remaining material on a material package and its location may be determined. First, image data associated with a material package may be received by a server. Next, material package data associated with the material package may be received. A Machine Learning (ML) model may then be used to determine an estimated remaining amount of material associated with the material package based upon input derived from the image data and the material package data.

26 Claims, 4 Drawing Sheets

PROVIDING PARTIAL MATERIAL PACKAGE REMAINING MATERIAL AND LOCATION

RELATED APPLICATION

Under provisions of 35 U.S.C. § 119(e), Applicant claims the benefit of U.S. Provisional Application No. 63/021,402, filed May 7, 2020, which is incorporated herein by reference.

BACKGROUND

Just-in-time (JIT) manufacturing, also known as just-in-time production, is a methodology aimed primarily at reducing flow times within production as well as response times from suppliers and to customers. JIT manufacturing may use radio-frequency identification (RFID). RFID is the wireless use of electromagnetic fields to transfer data, for the purposes of automatically identifying and tracking tags attached to objects. The RFID tag can be affixed to an object and used to track and manage inventory, assets, people, etc. For example, it can be affixed to cars, computer equipment, books, mobile phones, etc.

RFID provides a way for organizations to identify and manage tools and equipment (asset tracking), without manual data entry. RFID is being adopted for item level tagging in retail stores. This provides electronic article surveillance (EAS) and a self-checkout process for consumers. Automatic identification with RFID can be used for inventory systems. Manufactured products such as automobiles or garments can be tracked through the factory and through shipping to the customer.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
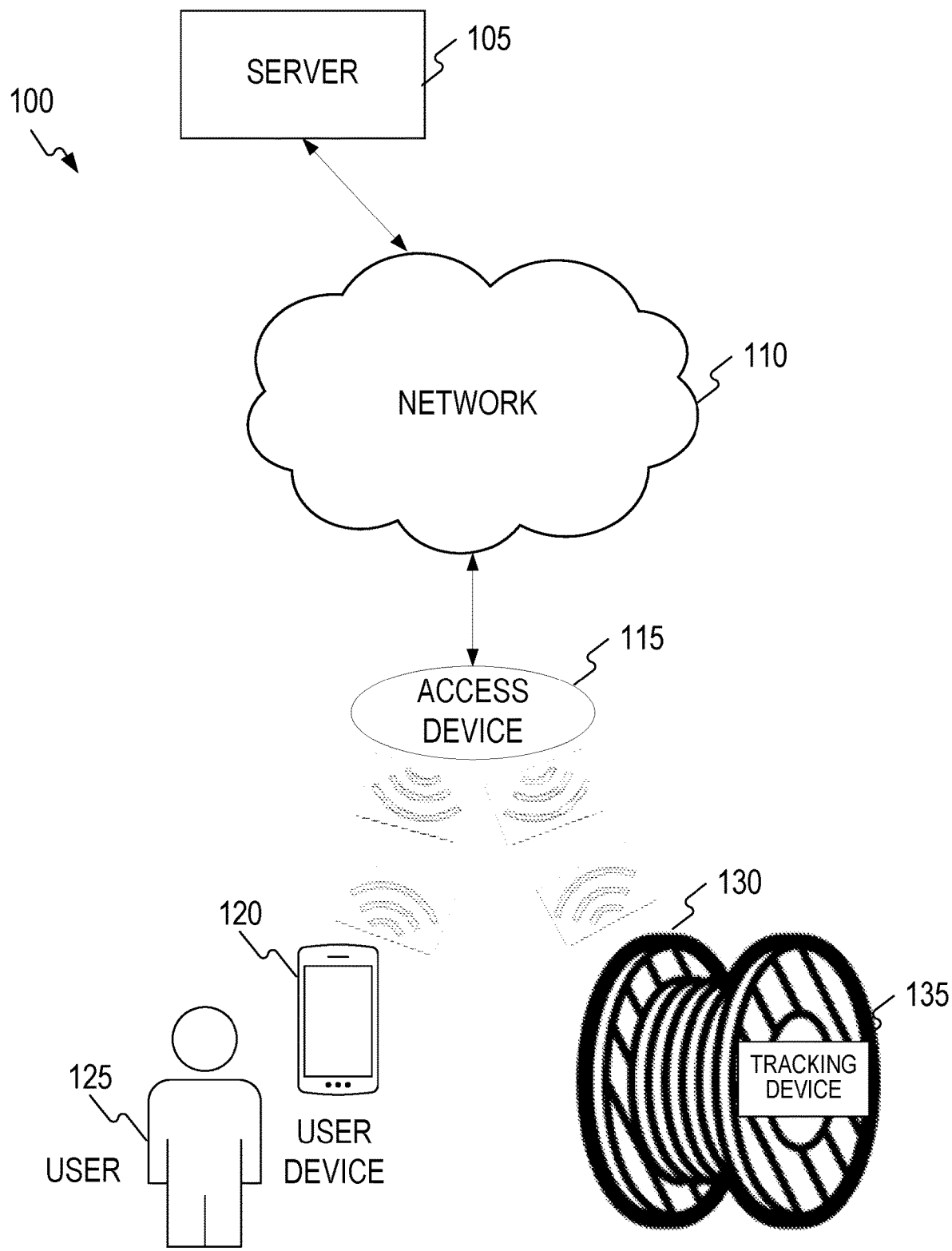
FIG. 1 is a block diagram of an operating environment for providing partial material package remaining material and location.

Remaining material on a material package and its location may be determined. First, image data associated with a material package may be received by a server. Next, material package data associated with the material package may be received. A Machine Learning (ML) model may then be used to determine an estimated remaining amount of material associated with the material package based upon input derived from the image data and the material package data.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Consistent with embodiments of the disclosure, tracking devices may be applied to material packages (e.g., reels) at a manufacture's staging area. Barcode scanner may then read and associate reel tags from the material packages and the applied tracking devices from the material packages. Data may be written to the tracking devices' memories and a database (e.g., a cloud database). Reels may have tracking devices placed inside one of the holes predrilled into the material packages' inner drums. A scanner may be used to scan a reel tag barcode and read the tracking device's barcode. As an alternative, a Radio-frequency identification (RFID) (e.g., an active RFID) chip on the tracking devices may be scanned with a barcode-UHF reader.

From the manufacture's staging area, material packages may be unloaded at a utility's location (e.g., an operations area) and may be automatically logged into the cloud database with the new location. The material packages may be read by an access device or series of access devices that may cover any location where the material packages may be. Updated location and automated receipt of material data may be sent to the database.

As material packages leave and return to the operations area on service trucks, access devices may read the tracking devices to log the events. Instead of using scales or load cells to calculate weight differences, a picture or series of pictures showing a top portion of a material package may be used by an Artificial Intelligence (AI) or Machine Learning (ML) process to calculate the remaining amount of material on the material package after accessing database information associated with the material package. This is may be accomplished, for example, by digitizing an area above the material on the material package up to the tops of flanges on the material package from a picture or series of pictures of the material package.

This information may be analyzed by a continuously improving algorithm to create accurate estimates of the remaining amount of material (e.g., length). The inputs may include a picture from, for example, a mobile device such as a smart phone taken from a perspective or multiple perspectives as needed by the algorithm. Over time, by requesting users to load pictures of a top portion of a reel when a scale or load cell is available, the algorithm may continuously improve (i.e., learn) to yield an estimate of actual length (e.g., footage) remaining on a material package.

A new length may be determined (e.g., after material has been removed) and written to both the tracking device and the database. Partial packages may be returned to the operations area for future use. Partial packages may be visible on the system through software on a server (e.g., the cloud) for day-to-day, outage, or storm response situations.

FIG. 1 shows a block diagram of an operating environment 100 for providing partial material package remaining material and location. As shown in FIG. 1, operating environment 100 may comprise a server 105, a network 110, an access device 115, a user device 120 operated by a user 125, and a material package 130. A tracking device 135 may be attached to and associated with material package 130. Server 105 may run on the cloud and provide partial material package remaining material and location as Software as a Service (SaaS). Network 110 may comprise, but is not limited to, the Internet.

Material package 130 may comprise a reel. Material associated with material package 130 comprises a long continuous flexible material capable of being wound on material package 130. For example, the material associated with material package 130 may comprises, but is not limited to, electrical cable, electrical wire, and flexible conduit.

Tracking device 135, for example, may be placed anywhere on the inside or outside of material package 130. A label may be including on tracking device 135 that may comprise an optical machine-readable representation of a material package identifier unique to tracking device 135. Tracking device 135 may also include a memory that may be read from wirelessly and written to wirelessly. For example, the material package identifier may be written to tracking device 135's memory. Furthermore, the initial amount of material in material package may be written to tracking device 135's memory. As material is consumed from material package 130, the remaining amount of material may be written to tracking device 135's memory and to the database.

Tracking device 135 may make wireless transmissions that may include the material package identifier. Tracking device 135 may also utilize the Global Positioning System (GPS) to obtain data indicative of tracking device 135's location and may include this data indicating tracking device 135's location in the wireless transmissions. Tracking device 135 may obtain its location data periodically or when it is pinged (e.g., by server 105 or user device 120). Tracking device 135 may store its location data in its memory. These transmissions may also include data corresponding to some or all of tracking device 135's memory. Tracking device 135 may make these wireless transmissions periodically or in response to being pinged (e.g., by server 105 or user device 120). Tracking device 135's transmissions may be encoded. Tracking device 135, for example, may use active RFID or Bluetooth. Notwithstanding, wireless communications to and from tracking device 135 may comprise any form of wireless communications including, but not limited to, Long-Term Evolution (LTE), Fourth Generation (4G), Fifth Generation (5G), Wi-Fi, and Bluetooth.

In some embodiments of the disclosure, access device 115 may comprise a Wi-Fi Access Point (AP) configured to support a wireless (e.g., Wi-Fi) hotspot. The Wi-Fi hotspot may comprise a physical location where user 125, operating user device 120, may obtain access to network 110 (e.g., Internet access), using Wi-Fi technology, via a Wireless Local Area Network (WLAN) using a router connected to a service provider.

In other embodiments of the disclosure, access device 115 may comprise a device that may be connected to a cellular network that may communicate directly and wirelessly with end use devices (e.g., user device 120 operated by user 125) to provide access to network 110 (e.g., Internet access). For example, access device 115 may comprise, but is not limited to, an eNodeB (eNB) or a gNodeB (gNB). The aforementioned cellular network may comprise, but is not limited to, an LTE broadband cellular network, a 4G broadband cellular network, or a 5G broadband cellular network, operated by a service provider. Notwithstanding, embodiments of the disclosure may use wireless communication protocols using, for example, Wi-Fi technologies, cellular networks, or any other type of wireless communications.

User device 120 may comprise, but is not limited to, a smartphone, a digital camera, a tablet device, a personal computer, a mobile device, a cellular base station, a telephone, a remote control device, a set-top box, a digital video recorder, a cable modem, a network computer, a mainframe, a router, or other similar microcomputer-based device capable of accessing and using a Wi-Fi network or a cellular network.

The elements described above of operating environment 100 (e.g., server 105, access device 115, user device 120, and tracking device 135) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
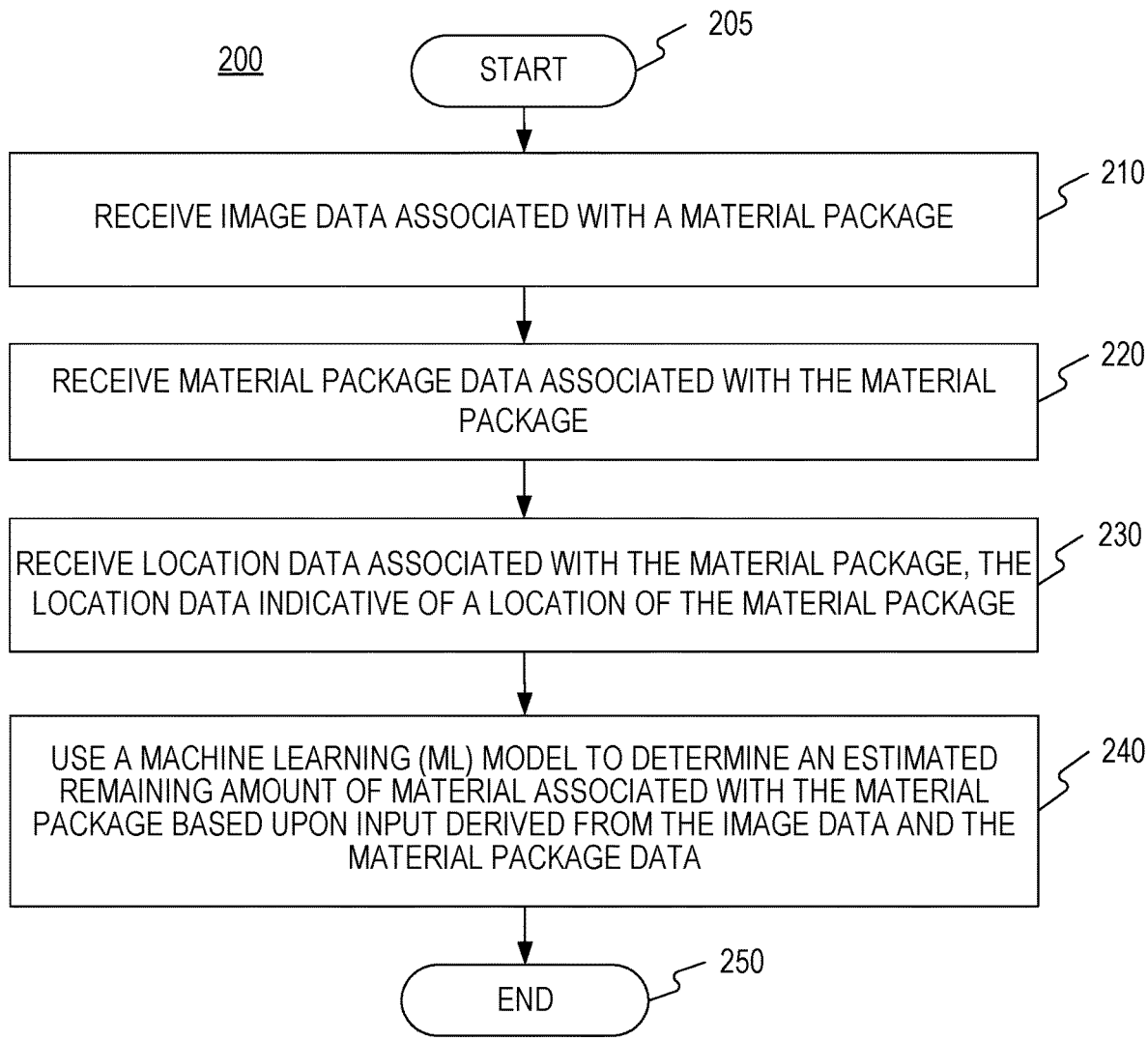
FIG. 2 is a flow chart of a method for providing partial material package remaining material and location.

FIG. 2 is a flow chart setting forth the general stages involved in a method 200 consistent with an embodiment of the disclosure for providing partial material package remaining material and location. Method 200 may be implemented using server 105 as described in more detail above with respect to FIG. 1. Ways to implement the stages of method 200 will be described in greater detail below in conjunction with FIG. 3.

Figure 3:
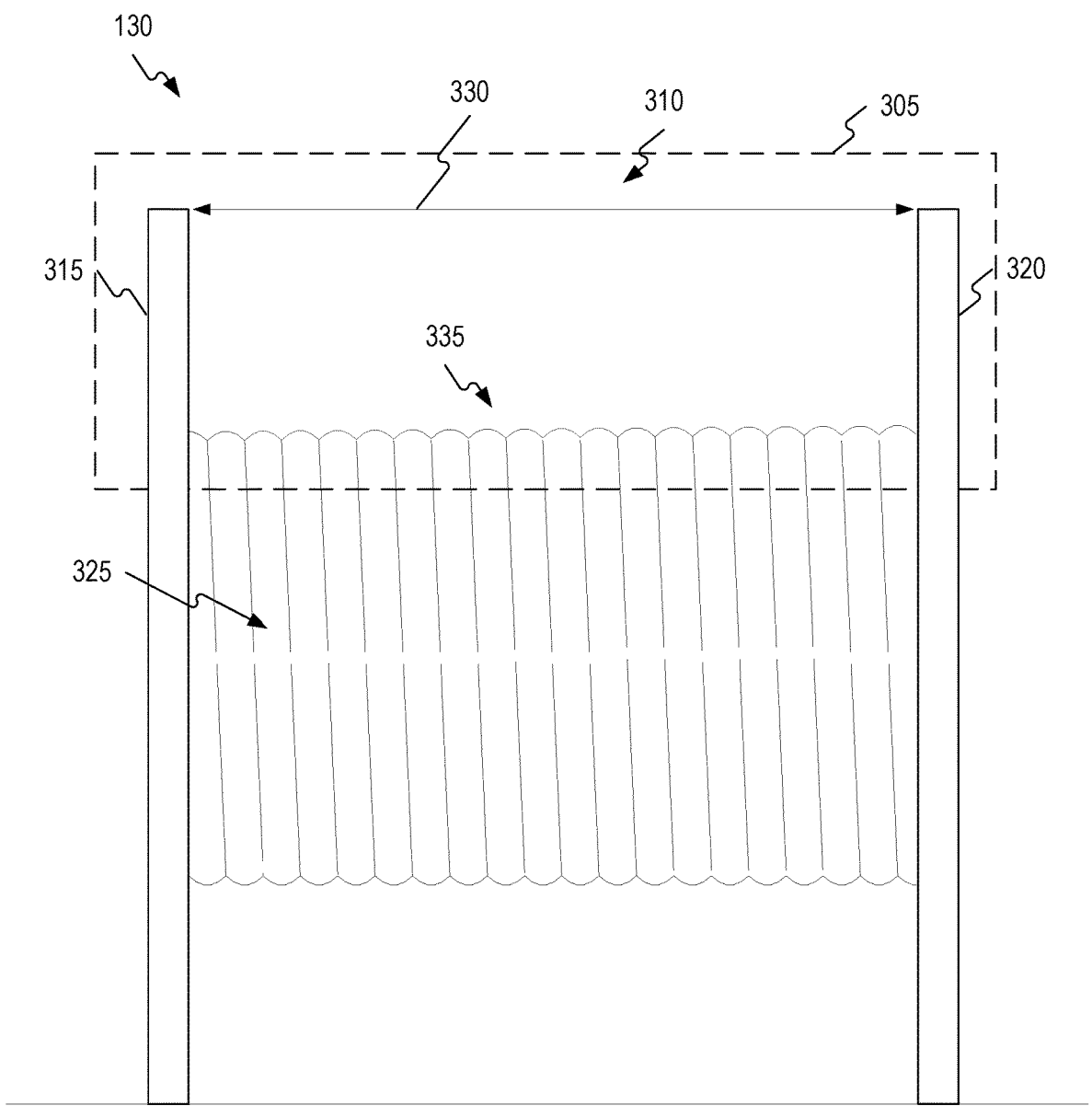
FIG. 3 is a block diagram illustrating an image of a material package.

Method 200 may begin at starting block 205 and proceed to stage 210 where server 105 may receive image data associated with material package 130. For example, user device 120 may include an image capturing device (e.g., a digital camera) that may be used to collect the image data. User 125 may operate user device 120 to capture an image 305 as shown in FIG. 3. In other words, user 125 may operate user device 120 to capture a picture or series of pictures showing a top portion 310 of material package 130. The image data may comprise, for example, a picture or series of pictures showing top portion 310 of material package 130. Consistent with embodiments of the disclosure, the image data may be captured by devices other than user device 120. For example, the image data may be captured by any image capturing device capable of capturing an image (e.g., a picture or series of pictures) of top portion 310 of material package 130. These image capturing devices may comprise, but are not limited to, image capturing devices included or disposed in material package 130, image capturing devices disposed in an operations area, or image capturing devices disposed in a satellite capable of viewing material package 130.

From stage 210, where server 105 receives the image data associated with material package 130, method 200 may advance to stage 220 where server 105 may receive material package data associated with material package 130. For example, the material package data may be received from tracking device 135 associated with material package 130. In other embodiments, a material package identifier may be received from tracking device 135 associated with material package 130 and a database may be queried with the material package identifier and the material package data may be received in response to querying the database.

The material package data may comprise any data describing material package 130 and/or the material on material package 130. For example, the material package data may comprise, but is not limited to, a type of material comprising the material on material package 130, a type of reel comprising material package 130, a size of a drum used by material package 130, a distance between a first flange 315 comprising material package 130 and a second flange 320 comprising material package 130, a distance from a center of first flange 315 and an end of first flange 315, and a distance from a center of second flange 320 and an end of second flange 320. The drum may be disposed between first flange 315 and second flange 320 and over which material 325 may be wound on material package 130. Notwithstanding, the material package data may comprise any data needed, in conjunction with a picture of top portion 310, to determine a remaining amount of material on material package 130. The material package data may be received via a wireless communication protocol.

The material package data may be received in response to determining that material package 130 has moved from a previous location based upon location data. Material 325 may comprise, but is not limited to, a long continuous flexible material capable of being wound on material package 130 comprising a reel. The material package data may be receive in response to material package 130 leaving an operations area or material package 130 returning to the operations area.

Once server 105 receives the material package data associated with material package 130 in stage 220, method 200 may continue to stage 230 where server 105 may receive location data associated with material package 130. The location data may be indicative of a location of material package 130. For example, the location data may be received via a wireless communication protocol (e.g., Wi-Fi, LTE, 4G, 5G, etc.). Tracking device 135 may determine material package 130's location using GPS, for example, and may send the location data indicating the determined location of material package 130 to server 105.

After server 105 receives the location data associated with material package 130 in stage 230, method 200 may proceed to stage 240 where server 105 may use a Machine Learning (ML) model to determine an estimated remaining amount of material associated with material package 130 based upon input derived from the image data and the material package data. For example, instead of using scales or load cells to calculate weight differences, a picture (e.g., image 305) or series of pictures showing a top portion 310 of material package 130 may be used, for example, by an artificial intelligence or ML process to determine the remaining amount of material on material package 130 after accessing database information associated with material package 130. This is may be accomplished, for example, by digitizing an area from the picture (e.g., image 305) above the material up to a flange or flanges on the material package. While image 305 may be used, embodiments of the disclosure are not limited to image 305 and images of other portions of material package 130 or an image include all of material package 130 may be used.

The input derived from the image data may comprise an area value equal to an area defined between an interior of first flange 315 of material package 130, an interior of second flange 320 of material package 130, a line 330 between a top of the interior of first flange 315 of material package 130 and top of the interior of second flange 320 of material package 130, and a top 335 of material 325 on material package 130. This area value may be used, along with material package data corresponding to material package 130, as an input query into a data base from which an estimated remaining amount of material associated with material package 130 may be derived. After the estimated remaining amount of material associated with material 130 package has been derived, a material package record corresponding to material package 130 in a material database (e.g., on server 105) may be updated with the estimated remaining amount of material associated with material package 130.

Consistent with embodiments of the disclosure, a ML model may be used. A supervised learning process may be used build a mathematical model of a set of data that contains both the inputs and the desired outputs. The data is known as training data, and consists of a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function may allow the algorithm to correctly determine the output for inputs that were not a part of the training data. An algorithm that improves the accuracy of its outputs or predictions over time is said to have learned to perform that task. Supervised learning algorithms include classification and regression. Classification algorithms may be used when the outputs are restricted to a limited set of values, and regression algorithms may be used when the outputs may have any numerical value within a range.

The database, consistent with embodiments of the disclosure, may comprise a model created through ML. The ML model may be created by training the ML model with a plurality of inputs and a corresponding plurality desired outputs. For example, over time, embodiments of the disclosure may allow users to load pictures of top portions of material packages (i.e., reels) and material package data corresponding to the pictured material packages to obtain inputs. Area values, as described above, may be derived from the pictures, and along with the material package data, may be used as inputs for the ML model. Corresponding remaining amounts of material associated with the pictured material packages may be used as corresponding outputs. The corresponding remaining amounts of material associated with the pictured material packages may be obtained, for example, by weighing the pictured material packages (i.e., where a scale or load cell is available to provide a remaining amount of material associated with material package by weighing the reels). Weighing is one example and other processes for determining the remaining amounts of material associated with the pictured material packages may be used. The algorithm may continuously improve the ML model through training.

Embodiments of the disclosure may provide a granular look into the material under the control of a particular operator (e.g., a utility company). For example, the operator may control a plurality of operations areas. Consistent with embodiments of the disclosure, the material database on server 105 may allow the operator to know the amount and type of material on every material package in every operations area controlled by the operator. For example, the operator may control a number of material packages comprising reels of 336.4 Aluminum Conductor Steel Reinforced (ACSR). The operator may query the material database on server 105 and learn at a particular moment in time that: i) the operator has 3,435 reels of 336.4 ACSR; ii) which operations center each reel is in; and iii) the total footage of 336.4 ACSR controlled by the operator is 2,576,225 feet.

Furthermore, this data may be augmented between operators in regions of a county or even on a national basis. Extending the aforementioned example, material database on server 105 may be queried to determine on a regional or national level: i) the number of reels of 336.4 ACSR; ii) which operations center each reel is in; and iii) the total footage of 336.4 ACSR on a regional or national level. This granularity of data may be useful to manufactures when determining how to determine what types of materials to manufacture. In other words, if there is a glut of 336.4 ACSR, the manufacturer may decide not to make any more for a while. Also, during a national disaster such as a hurricane, it may be useful to know where needed materials are to aid in restoration efforts.

Once server 105 uses the ML model to determine an estimated remaining amount of material associated with material package 130 based upon input derived from the image data and the material package data in stage 240, method 200 may then end at stage 250.

Figure 4:
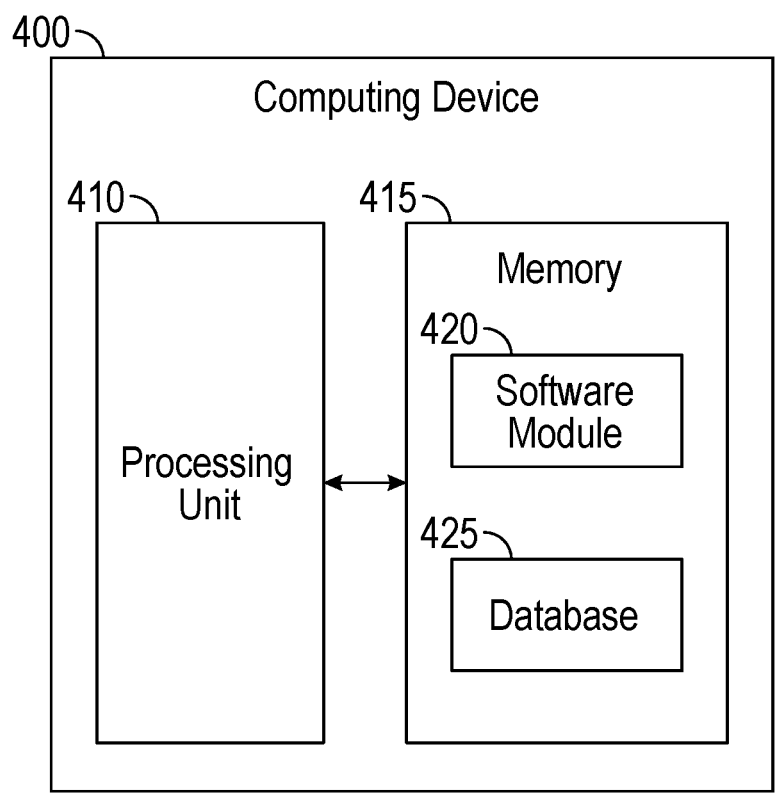
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing partial material package remaining material and location as described above with respect to FIG. 2. Computing device 400, for example, may provide an operating environment for server 105, access device 115, user device 120, and tracking device 135. Server 105, access device 115, user device 120, and tracking device 135 may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
  receiving, by a server, image data associated with a material package;
  receiving material package data associated with the material package; and
  using a Machine Learning (ML) model to determine an estimated remaining amount of material associated with the material package based upon input derived from the image data and the material package data wherein the input derived from the image data comprises an area value equal to an area defined between a first flange of the material package, a second flange of the material package, a line between a top of the first flange of the material package and a top of the second flange of the material package, and a top of the material on the material package.

2. The method of claim 1, further comprising receiving the material package data from a tracking device associated with the material package.

3. The method of claim 1, further comprising:
  receiving a material package identifier from a tracking device associated with the material package; and
  querying a database with the material package identifier wherein receiving the material package data comprises receiving the material package data in response to querying the database.

4. The method of claim 1, wherein the material package data comprises: a type of material comprising the material, a type of reel comprising the material package, a size of a drum used by the material package, a distance between a first flange comprising the material package and a second flange comprising the material package.

5. The method of claim 1, further comprising receiving the image data from an image data capturing device disposed on the material package.

6. The method of claim 1, further comprising receiving the image data from an image data capturing device operated by a user.

7. The method of claim 1, further comprising training the ML model with a plurality of inputs and a corresponding plurality desired outputs.

8. The method of claim 1, further comprising updating a material package record with the estimated remaining amount of material associated with the material package.

9. The method of claim 1, further comprising receiving location data associated with the material package, the location data indicative of a location of the material package.

10. The method of claim 9, wherein receiving the location data comprises receiving the location data via a wireless communication protocol.

11. The method of claim 1, wherein receiving the material package data comprises receiving the material package data via a wireless communication protocol.

12. The method of claim 1, wherein receiving the material package data comprises receiving the material package data in response to determining that the material package has been used, wherein determining that the material package has been used comprises determining that the material package has moved from a previous location based upon location data.

13. The method of claim 1, wherein receiving the material package data comprises receiving the material package data wherein the material package comprises a reel.

14. The method of claim 1, wherein receiving the material package data comprises receiving the material package data wherein the material associated with the material package comprises at least one of the following: electrical cable, electrical wire, and flexible conduit.

15. The method of claim 1, wherein receiving the material package data comprises receiving the material package data wherein the material associated with the material package comprises a long continuous flexible material capable of being wound on the material package comprising a reel.

16. The method of claim 1, wherein receiving the material package data comprises receiving the material package data in response to the material package leaving an operations area.

17. The method of claim 1, wherein receiving the material package data comprises receiving the material package data in response to the material package returning to an operations area.

18. The method of claim 1, further comprising augmenting the remaining amount of material associated with the material package with remaining amounts of material associated with a plurality of other material packages having a same material type as the material package to determine an amount of the same material type an operator has.

19. The method of claim 1, further comprising augmenting the remaining amount of material associated with the material package with remaining amounts of material associated with a plurality of other material packages having a same material type as the material package to determine an amount of the same material type a plurality of operators have.

20. The method of claim 19, further comprising making a manufacturing decision based on the amount of the same material type the plurality of operators have.

21. A system comprising:
  a memory storage; and
  a processing unit coupled to the memory storage, wherein the processing unit is operative to:
    receive image data associated with a material package;
    receive material package data associated with the material package wherein the material package data comprises: a type of material comprising the material, a type of reel comprising the material package, a size of a drum used by the material package, a distance between a first flange comprising the material package and a second flange comprising the material package; and use a Machine Learning (ML) model to determine an estimated remaining amount of material associated with the material package based upon input derived from the image data and the material package data.

22. The system of claim 21, wherein the input derived from the image data comprises an area value equal to an area defined between a first flange of the material package, a second flange of the material package, a line between a top of the first flange of the material package and a top of the second flange of the material package, and a top of the material on the material package.

23. The system of claim 21, wherein the processing unit being operative to receive the material package data comprises the processing unit being operative to receive the material package data wherein the material associated with the material package comprises a long continuous flexible material capable of being wound on the material package comprising a reel.

24. A non-transitory computer-readable medium that stores a set of instructions which when executed perform a method comprising:
 receiving image data associated with a material package;
 receiving material package data associated with the material package; and
 using a Machine Learning (ML) model to determine an estimated remaining amount of material associated with the material package based upon input derived from the image data and the material package data wherein the input derived from the image data comprises an area value equal to an area defined between a first flange of the material package, a second flange of the material package, a line between a top of the first flange of the material package and a top of the second flange of the material package, and a top of the material on the material package.

25. The non-transitory computer-readable medium of claim 24, wherein receiving the material package data comprises receiving the material package data wherein the material associated with the material package comprises a long continuous flexible material capable of being wound on the material package comprising a reel.

26. The non-transitory computer-readable medium of claim 24, wherein the material package data comprises: a type of material comprising the material, a type of reel comprising the material package, a size of a drum used by the material package, a distance between a first flange comprising the material package and a second flange comprising the material package.

* * * * *